United States Patent [19]

Abbott et al.

[11] Patent Number: 4,826,276

[45] Date of Patent: May 2, 1989

[54] OPTICAL FIBER FEEDTHROUGH ASSEMBLY HAVING A RIGIDIZING ARRANGEMENT THEREIN

[75] Inventors: Kathleen S. Abbott, Wilmington, Del.; Frank M. Willis, Wenonah, N.J.

[73] Assignee: E. I. Du Pont de Nemours and Company, Wilmington, Del.

[21] Appl. No.: 74,793

[22] Filed: Jul. 17, 1987

[51] Int. Cl.⁴ .................................................. G02B 6/36
[52] U.S. Cl. .................................. 350/96.20; 350/96.21
[58] Field of Search ................ 350/96.20, 96.21, 96.22

[56] References Cited

U.S. PATENT DOCUMENTS

| | | | |
|---|---|---|---|
| 3,582,324 | 6/1971 | Kunert et al. | 75/134 |
| 4,119,363 | 10/1978 | Camlibel et al. | 350/96.20 |
| 4,144,504 | 3/1979 | Leggett et al. | 331/94.5 P |
| 4,158,477 | 6/1979 | Phillips et al. | 350/96.21 |
| 4,338,577 | 7/1982 | Sato et al. | 372/36 |
| 4,360,965 | 11/1982 | Fujiwara | 29/582 |
| 4,430,376 | 2/1984 | Box | 428/174 |
| 4,432,464 | 2/1984 | Seats et al. | 220/2.1 A |
| 4,456,334 | 6/1984 | Henry et al. | 350/320 |
| 4,482,201 | 11/1984 | Dousset | 350/96.20 |
| 4,565,558 | 1/1986 | Keil et al. | 65/1 |
| 4,566,892 | 1/1986 | Ertel | 65/59.24 |
| 4,591,711 | 5/1986 | Taumberger | 250/227 |
| 4,615,031 | 9/1986 | Eales et al. | 372/36 |
| 4,687,290 | 8/1987 | Prussas | 350/92.20 |

FOREIGN PATENT DOCUMENTS

| | | |
|---|---|---|
| 148012 | 7/1985 | European Pat. Off. |
| 0181532 | 5/1986 | European Pat. Off. |
| 3407820 | 11/1985 | Fed. Rep. of Germany |
| 3533920 | 3/1987 | Fed. Rep. of Germany |
| 1541495 | 3/1979 | United Kingdom |
| 1585899 | 3/1981 | United Kingdom |
| 2125180 | 2/1984 | United Kingdom |
| 2124402 | 2/1984 | United Kingdom |
| 2131971 | 6/1984 | United Kingdom |
| 2150858 | 7/1985 | United Kingdom |

*Primary Examiner*—William L. Sikes
*Assistant Examiner*—Akm E. Ullah

[57] ABSTRACT

A fiber feedthrough assembly having a rigidizing member in the form of a quartz tube surrounding an axial length of a glass fiber defined between a shoulder formed by the jacket of the fiber and the axially inner end of a hermetic seal. The coefficients of thermal expansion of the tube and the fiber are substantially equal.

12 Claims, 1 Drawing Sheet

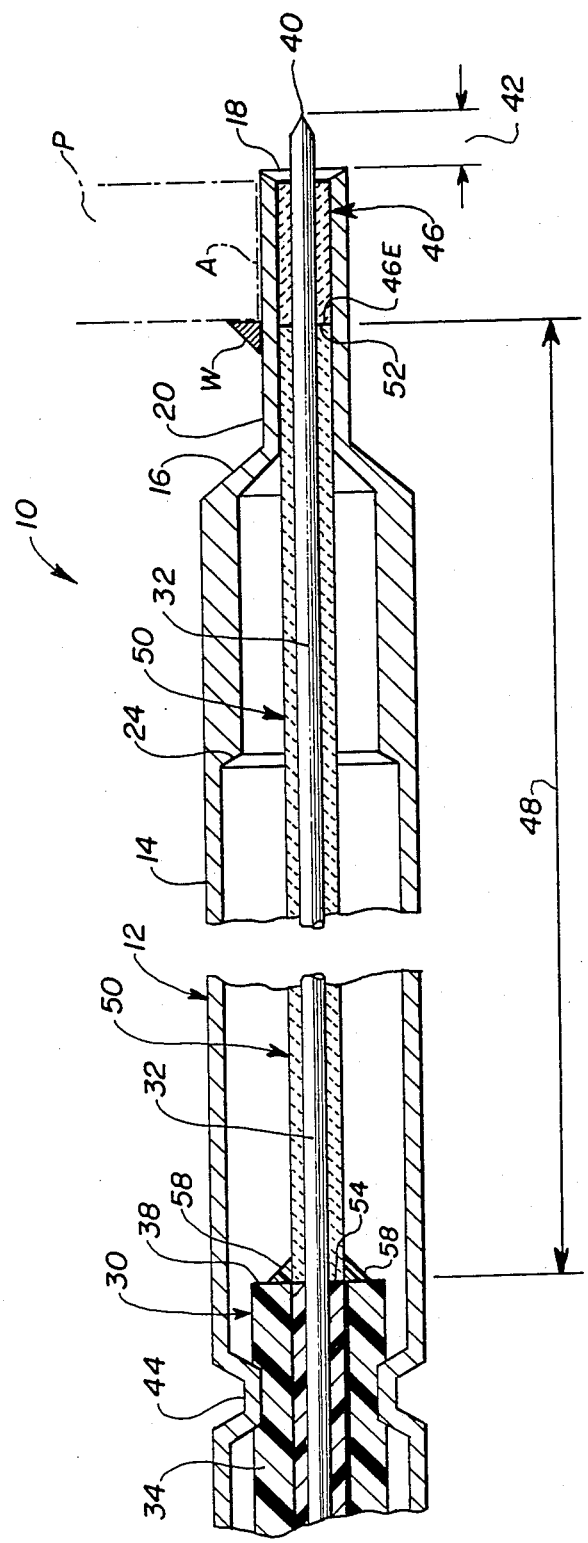

OPTICAL FIBER FEEDTHROUGH ASSEMBLY HAVING A RIGIDIZING ARRANGEMENT THEREIN

BACKGROUND OF THE INVENTION

1. Field of the Invention

The present invention relates to a feedthrough assembly for conducting an optical fiber into the interior of a package for an opto-electronic device and, in particular, to such a feedthrough assembly having a rigidizing arrangement therein.

2. Description of the Prior Art

Opto-electronic communications systems which utilize light energy to transmit intelligence between a transmitting device and a receiving device are known. Exemplary of such systems are those shown in U.S. Pats. Nos. 4,119,363 (Camlibel et al.); 4,615,031 (Eales et al.); 4,482,201 (Dousset); 4,456,334 (Henry et al.); 4,360,965 (Fujiwara); and 4,338,577 (Sato et al.); United Kingdom Pats. Nos. 2,131,971 (Plessey) and 2,124,402 (Standard Telephone and Cables) and EPO Application No. 181,532 (Siemens).

Such communications systems typically include a transmitting device utilizing a light source, such as a solid state laser, and a receiving device utilizing a photoresponsive semiconductor. The functional elements of both the transmitting device and the receiving device are housed in a hermetically sealed package having a stability leak rate equal to or less than $1 \times 10^{-8}$ atmospheres cc/sec Helium.

The light signals utilized in such systems are conveyed between the transmitting and receiving devices over an optical fiber link. United Kingdom Pats. Nos. 1,585,899 (Plessey) and 2,150,858 (Standard Telephone and Cable) disclose typical examples of optical fibers useful for this purpose. U.S. Pat. No. 4,565,558 (Keil et al.) and German Application No. 3,407,820 (Siemens) both relate to techniques whereby an optical fiber may be provided with a lensed end whereby light energy may be effectively coupled thereinto.

The fiber is usually supported in a feedthrough assembly comprising a metal sleeve surrounding the fiber. The fiber is stripped of its protective jacket for a predetermined distance adjacent its lensed end. The sleeve is crimped or otherwise fastened into secure contact with the jacket. The lensed end of the optical fiber may project past the end of the metal sleeve. The annular region between the inner surface of the sleeve and the exposed outer surface of the fiber is hermetically sealed, as by a glass insert. U.K. Pat. No. 1,541,495 (standard Telephone and Cable) and U.S. Pats. Nos. 4,430,376 (Box) and 4,566,892 (Ertel) all disclose glass to metal seals. Copending application Ser. No. 074,791, filed contemporaneously herewith, claiming priority from U.K. Application No. 8629158 filed Dec. 5, 1986, discloses a feedthrough assembly for an optical fiber having a glass insert that forms a hermetic seal between the fiber and the sleeve. In accordance with this last referenced application all of the stresses on the insert are compressive in nature in order to minimize the tendency of cracking to occur or to propagate.

Each package is provided with an aperture whereby the feedthrough assembly may enter into the interior thereof. The feedthrough assembly is appropriately positioned with respect to the package in a suitable relationship with the functional element of the transmitting or receiving device, as the case may be, and thereafter secured, as by laser welding, so as to remain in that selected position. United Kingdom Application Serial No. 8708032, filed Apr. 3, 1986, discloses a laser welding method whereby the feedthrough may be secured in the package.

When a situation is presented in which the fiber is attached adjacent one end of its sleeve by a hermetic seal, however formed, and the jacket of the fiber is also attached to the sleeve, as by crimping, there occurs a phenomenon known as "grow out". Grow out is the tendency of the jacket to grow and to contract axially relative to the fiber under thermal cycling so that the portion of the glass fiber intermediate these points of attachment undergoes compressive axial loading which leads to column bending. The bending may be of such a magnitude that the fiber fractures and is thus unable to conduct light energy. It should be understood that the tendency to grow out would occur whatever the form of the hermetic seal and whatever the form of attachment between the jacket and the sleeve. It is known in the art to protect and to support the fiber in the region between these points of attachment with an epoxy material, as disclosed in the above-cited patent to Eales et al. By introducing the epoxy into the region between these points of attachment both the fiber and its jacket may be attached to a common support member thereby mitigating the effects of grow out. Because of the small dimensions and close tolerances involved the epoxy is commonly introduced using a vacuum backfill process. It is also known in the art to use epoxy glass tubes for forming an optical splice. Exemplary of such a system is the UVC Optical Splice and the Splice for Pigtails (P/N 20126), both sold by Norland Products Inc., New Brunswick, N.J.

In view of the foregoing it is believed advantageous to provide an optical fiber feedthrough assembly that reduces the effects of grow out while avoiding a vacuum backfill process.

SUMMARY OF THE INVENTION

The present invention relates to an optical fiber feedthrough assembly of the type having a metallic sleeve and an optical fiber in the sleeve, with a hermetic seal being defined between the fiber and the sleeve. The fiber has a jacket thereon with a portion of the jacket being removed to define a shoulder such that a predetermined axial length of the fiber is exposed between the shoulder and the seal. The jacket is of the type that exhibits a tendency to grow out with respect to the fiber in response to thermal cycling whereby the fiber may buckle and become discontinuous.

In accordance with the present invention a rigidizing member preferably in the form of a tube surrounds and supports the axially extending length of exposed fiber. The tube lies in abutting contact with the shoulder and in abutting contact with the inner end of the hermetic seal between the fiber and the sleeve. The combination of the tube and the fiber has a rigidity associated therewith such that the fiber is able to withstand the effects of grow out of the jacket without fracturing. In particular the combination of the tube and the fiber is sufficiently rigid that it is able to withstand at least one, but most preferably, ten thermal cycles from $-55$ degrees C. to 125 degrees C. without fracturing so as to still conduct light therethrough.

Preferably the rigidizing member is fabricated from a material, such as quartz, that exhibits thermal characteristics that closely match the thermal characteristics of the fiber.

BRIEF DESCRIPTION OF THE DRAWING

The invention will be more fully understood from the following detailed description thereof, taken in connection with the accompanying drawing FIGURE, which forms a part of this application, and which is a side elevational view, entirely in section, of a optical fiber feedthrough assembly in accordance with the present invention.

DETAILED DESCRIPTION OF THE INVENTION

The fiber feedthrough assembly generally indicated by reference character 10 includes an outer sleeve 12 fabricated from a suitable weldable material, such as stainless steel, whereby the feedthrough may be mounted in secure attachment to the package of the component of the fiber optic communications system with which the feedthrough assembly is associated. The wall of the package is shown in dot-dash lines in the FIGURE and is indicated by reference character P. The package P has an aperture A formed therein through which the feedthrough assembly 10 may enter into the interior of the package P. The feedthrough assembly 10 may be secured in an appropriate position with respect to the package as by a weld W.

The sleeve 12 includes a main tubular portion 14 that tapers, as at 16, adjacent the open end 18 of the sleeve 12 to form a neck portion 20. The neck portion 20 exhibits a relatively narrower diameter than that presented by the main tubular portion 14 of the sleeve 10. For ease of manufacturability the sleeve 10 is preferably internally narrowed, as at 24.

A fiber optic cable 30 extends through the sleeve. The cable 30 comprises a glass fiber 32 having a protective jacket 34 provided therearound. The fiber 32 may be formed from any suitable glass or plastic material. A single or a multi-mode silica glass optical fiber cable 30 having an outer diameter of one hundred twenty-five (125) micrometers is preferred. The insulating jacket 34 maybe formed of nylon outer buffer layer and having a silicone inner buffer layer. Alternatively the outer buffer layer may be Hytrel ® polyester elastomer with the inner buffer layer being acrylate. The jacket 34 is stripped from the fiber 32 for a predetermined length near end thereof thereby to define a shoulder or abutment 38. The end 40 of the fiber 32 may be lensed, if desired. The end 40 of the bare fiber 32 may extend a predetermined distance 42 past the open end 18 of the neck portion 20 of the sleeve 10. The jacket 34 of the fiber 30 is fixedly attached, as by crimping, to the sleeve 10, as indicated at 44. As seen from the FIGURE the crimp 44 is spaced any convenient axial distance behind the shoulder 38.

The bare fiber 32 is hermetically sealed, as indicated by the reference character 46, to the interior of the sleeve 10 in the vicinity of the neck portion 20. Any suitable technique may be used to define the hermetic seal 46, although it is preferred that a glass preform be provided to form the compressive hermetic seal arrangement as disclosed and claimed in copending application Ser. No. 074,791, filed contemporaneously herewith, claiming priority of U.K. Application No. 8629158 filed Dec. 5, 1986. The preferred candidate glasses for the preform as disclosed in this copending application include Owens-Illinois ESG 1015 glass and Owens-Illinois PP-100 glass. A predetermined length 48 of the fiber 32, measured axially with respect to the sleeve 10, is left unsupported between the axially inner end 46E of the seal 46 and the shoulder 38.

It is generally well known in this art that in situations where a fiber 30 is disposed within a sleeve 10 and the fiber 30 is securely attached to the sleeve 10 at two axially spaced locations thereon, such as the crimp point 44 and at the region of the hermetic seal 46, there occurs what is known as "grow out". Grow-out is the tendency of the jacket portion 34 to grow and to contract axially under thermal cycling so that the unsupported length 48 of the glass fiber 32 undergoes compressive axial loading which leads to column bending. The bending may be of such a magnitude that the fiber 32 fractures and is thus unable to conduct light energy. It should be understood that the tendency to grow out would occur whatever the form of the hermetic seal 46 between the fiber 32 and the sleeve 10 and whatever the form of attachment between the jacket 34 and the sleeve 10.

In accordance with this invention the tendency of the fiber to fracture due to grow out during thermal cycling is reduced. To this end the unsupported length 48 of the bare fiber 32 is surrounded by a rigidizing member 50. The member 50 has a first end 52 and a second end 54 thereon. The member 50 is disposed on the interior of the sleeve such that the end 52 thereof abuts against the inner end 46E of the seal 46. The abutting contact an epoxy fillet weld. The abutting contact may be defined with an epoxy cushion between the end of the member 50 and the shoulder 44. The abutting contact could be defined with the end 54 of the member 50 penetrating into the inner buffer layer (either silicone or acrylate) of the jacket 34. Some of these forms of abutting contact may be combined, if desired, to accommodate for dimensional buildup. The abutting contact is most preferably formed using the simple mechanical abutment with the epoxy fillet weld. Suitable for use as the epoxy in such instance is that Type Light Weld 305 Methacrylic Adhesive such as that sold by Dymax Inc. as MSDS No. 1665. This epoxy is believed suitable for use in the other above-mentioned forms of abutting contact. Also believed suitable for use as the epoxy are those sold by Dymax Inc. as numbers 488, 625 and X13055B.

The material used to form the rigidizing member 50 is preferably selected so as to closely match the thermal characteristics of the fiber 32. That is to say, the coefficient of thermal expansion of the rigidizing member 50 approximates and, in the most preferred instance, is substantially equal to the coefficient of thermal expansion of the fiber 32. The close match of thermal coefficients is desirable in order to prevent relative movement between the rigidizing member 50 and the length 48 of the fiber 32. This close match eliminates the possibility of scratching of the length 48 of the fiber 32 by the rigidizing member 50.

In the preferred case the rigidizing member 50 is thermally stable at the soldering temperature of the glass preform used to form the seal 46. This temperature is preferably ninety degrees C above the glass transition temperature of the glass preform.

In the preferred case the rigidizing member 50 takes the form of a quartz tube. It is believed that Pyrex ® glass, Kimball KG-33 laboratory glass, Corning 7052 Kovar sealing glass and Owens-Illinois OI ESG 1015 glass may be used for the rigidizing member 50.

With the rigidizing member 50 positioned over the length 48 of the fiber 32 the combination of the member 50 and the glass fiber 32 exhibits a rigidity sufficient to withstand the effects of grow out of the jacket 34 without fracturing. This improved rigidity may be shown as follows.

The fiber feedthrough assembly 10 having a rigidizing arrangement therein in accordance with the present invention is subjected to the following sequence of tests. Upon completion of assembly and prior to thermal cycling, each feedthrough assembly 10 is inspected for its ability to conduct light.

Each feedthrough assembly is then temperature cycled. The feedthrough assembly is inserted into an environmental test chamber and thermally cycled between −55 degrees C. and 125 degrees C. Initially the feedthrough assembly 10 is transferred from a dry nitrogen atmosphere at room temperature into a similar atmosphere at 125 degrees C. in a matter of five (5) seconds. It is held at 125 degrees C. for ten (10) minutes and then transferred into a dry nitrogen environment at −55 degrees C. in a matter of five (5) seconds. After ten (10) minutes at −55 degrees C. the feedthrough assembly 10 is subjected to a repeated thermal cycling, i.e., it is transferred to the 125 degrees C. atmosphere in five (5) seconds and held for ten (10) minutes, then transferred to −55 degrees C. in five (5) seconds and held for ten (10) minutes. This hot-to-cold cycle is repeated nine times for a total of ten thermal cycles.

After the tenth cycle the feedthrough assembly 10 is tested for shock and vibration. The feedthrough assembly 10 having a rigidizing arrangement is then tested for its ability to conduct light.

The light continuity test used before and after the thermal and vibration tests basically comprises the step of conducting white light through the fiber from the unattached tail end of the fiber through to the lensed end and detecting whether the light is seen emerging from the lensed end of the fiber. The first continuity test utilizes a Leitz Wetzler CMM-2D measuring microscope set at 100X magnification. The lensed end of the fiber is faced upwardly toward the objective of the microscope. Light is launched into the fiber from its free (i.e., unlensed) end from a white light source such as that manufactured by Dolan-Jenner Industries Inc., using a General Electric EKE 150 watt, 21 volt projection lamp. If the fiber is continuous a glow is visually detected by an operator against a black field. It may be desirable to apply some quantitative measurement of the light intensity detected at the lensed end of the fiber as against the light intensity launched into the fiber tail as a determinant of acceptable fiber continuity. The second continuity test (performed after the thermal and vibration tests) is basically similar. A Wild Heerbrig M3Z microscope set at 40X magnification is used to visually detect a glow against a black field. The fiber is positioned in the same manner as discussed. The light source in this test is that manufactured by Hacker Instruments, Inc. using a General Electric DNF 150 watt, 21 volt projection bulb.

The second continuity test may be effected without the thermal and/or vibration tests having been performed, or after only some predetermined number of thermal cycles. For example the continuity testing may be done after one thermal cycle, after ten thermal cycles, or some other predetermined number of thermal cycles, whether or not vibration testing is carried out.

The combination of the rigidizing member 50 and the exposed portion 48 of the fiber has a rigidity associated therewith such that the fiber 32 is able to withstand at least one, ten, or some other predetermined number without fracturing due to grow out of the jacket thermal cycles from −55 degrees C. to 125 degrees C. and still conduct light therethrough with no more than a twenty percent attenuation. Without the rigidizing member of this invention product yields after this type of testing as described were less than five (5) percent. The presence of the rigidizing member has increased yields by an order of magnitude, i.e., at least 50% yield. Yields of 90% may be achieved.

The inside diameter of the rigidizing member 50 is closely sized to the outer diameter of the exposed portion 48 of the fiber 32 in order to assist in imparting structural rigidity thereto. In the case where the outer diameter of the fiber is 125 micrometers, the rigidizing member 50, in the form of a quartz tube, has an inside diameter of 150 micrometers. The outside diameter of the quartz tube is 335 micrometers.

It is well known in the art that in order to reduce buckling loads due to column bending, one of the most influential variables is the area moment of inertia. The area moment of inertia can be increased by increasing the cross sectional area of a member or by changing its shape, e.g., from circular to tubular. In this invention the addition of the rigidizing member in the form of the quartz tube surrounding the fiber serves to significantly increase the area moment of inertia by increasing the cross sectional area of the combination of the tube 50 and the fiber 32. The cross sectional shape of the combination remains circular. It lies within the contemplation of this invention to utilize a rigidizing member 50 that has other than a circular outer diameter so that the cross sectional shape of the combination of the tube 50 and the fiber 32 would differ from the shape of the fiber.

Those skilled in the art, having the benefit of the teachings of the present invention may effect numerous modifications thereto. It should be understood that these modifications as are to be construed as lying within the scope of the present invention, as defined by the appended claims.

What is claimed is:

1. In an optical fiber feedthrough assembly of the type having a sleeve, an optical fiber in the sleeve and a seal between the fiber and the sleeve, the fiber having a jacket thereon, the jacket being fixed to the sleeve with a portion of the jacket being removed to define a shoulder such that a predetermined axial length of the fiber is exposed between the shoulder and the seal, the jacket having the tendency to grow out in response to thermal cycling whereby the fiber may fracture and become discontinuous, wherein the improvement comprises:
a rigidizing member in the form of a tube surrounding the predetermined axial length of the fiber, the tube being in abutting contact with the shoulder and in abutting contact with the seal, the combination of the tube and the fiber having a rigidity associated therewith such that the fiber is able to withstand the effects of grow out without fracturing.

2. The apparatus of claim 1 wherein the combination of the tube and the fiber is able to withstand the effects of grow out of the jacket without fracturing after at least one thermal cycle from −55 degrees C. to 125 degrees. C.

3. The apparatus of claim 1 wherein the combination of the tube and the fiber is able to withstand the effects of grow out of the jacket without fracturing after at least ten thermal cycles from −55 degrees C. to 125 degrees C.

4. The apparatus of claim 1 wherein the coefficient of thermal expansion of the tube and the coefficient of thermal expansion of the fiber are substantially equal.

5. The apparatus of claim 2 wherein the coefficient of thermal expansion of the tube and the coefficient of thermal expansion of the fiber are substantially equal.

6. The apparatus of claim 3 wherein the coefficient of thermal expansion of the tube and the coefficient of thermal expansion of the fiber are substantially equal.

7. The apparatus of claim 1 wherein the tube is quartz.

8. The apparatus of claim 2 wherein the tube is quartz.

9. The apparatus of claim 3 wherein the tube is quartz.

10. The apparatus of claim 4 wherein the tube is quartz.

11. The apparatus of claim 5 wherein the tube is quartz.

12. The apparatus of claim 6 wherein the tube is quartz.

* * * * *